(12) United States Patent
Chen et al.

(10) Patent No.: US 10,996,380 B2
(45) Date of Patent: May 4, 2021

(54) OPTICAL ASSEMBLY AND THE METHOD TO MAKE THE SAME

(71) Applicant: UBRIGHT OPTRONICS CORPORATION, Taoyuan County (TW)

(72) Inventors: Hui-Yong Chen, Taoyuan County (TW); Yi-Long Tyan, Taoyuan County (TW)

(73) Assignee: UBRIGHT OPTRONICS CORPORATION, Taoyuan County (TW)

( * ) Notice: Subject to any disclaimer, the term of this patent is extended or adjusted under 35 U.S.C. 154(b) by 264 days.

(21) Appl. No.: 16/388,878

(22) Filed: Apr. 19, 2019

(65) Prior Publication Data

US 2019/0243035 A1 Aug. 8, 2019

Related U.S. Application Data

(63) Continuation of application No. 15/803,826, filed on Nov. 5, 2017, now Pat. No. 10,310,147, which is a
(Continued)

(51) Int. Cl.
*G02B 5/02* (2006.01)
*C09J 133/06* (2006.01)
(Continued)

(52) U.S. Cl.
CPC ............ *G02B 5/0231* (2013.01); *C08L 33/06* (2013.01); *C08L 33/08* (2013.01); *C09J 133/06* (2013.01);
(Continued)

(58) Field of Classification Search
CPC ...... G02B 5/0231; G02B 5/02; G02B 5/0205; G02B 5/021; G02B 5/0268; C08L 33/06;
(Continued)

(56) References Cited

U.S. PATENT DOCUMENTS 5,589,563 A * 12/1996 Ward ..................... A61L 27/18
210/500.21
9,581,754 B2 * 2/2017 Shibata ................ G02B 6/0055
(Continued)

*Primary Examiner* — William R Alexander
(74) *Attorney, Agent, or Firm* — Min-Lee Teng; Litron Patent & Trademark Office

(57) ABSTRACT

The present invention discloses an optical assembly. The optical assembly comprises: a first optical film comprising a first surface; an adhesive disposed on the first surface of the first optical film; and a second optical film comprising a second surface, wherein the second surface of the second optical film comprises a plurality of microstructures, wherein the plurality of microstructures are bonded to the adhesive; wherein the adhesive is made of a first material and the plurality of microstructures are made of a second material, wherein the hydrophilic/hydrophobic characteristic of the first material is configured with respect to the hydrophilic/hydrophobic characteristic of the second material such that the adhesive force between the adhesive and the plurality of microstructures of the second optical film is greater than 100 g/25 mm and the optical gain of the optical assembly is greater than 1.5.

16 Claims, 7 Drawing Sheets

Related U.S. Application Data continuation of application No. 15/093,752, filed on Apr. 8, 2016, now Pat. No. 9,841,542.

(60) Provisional application No. 62/301,640, filed on Mar. 1, 2016.

(51) Int. Cl.
    *C08L 33/06*      (2006.01)
    *C08L 33/08*      (2006.01)
    *C09J 133/08*      (2006.01)

(52) U.S. Cl.
    CPC .............. *C09J 133/08* (2013.01); *G02B 5/02* (2013.01); *G02B 5/021* (2013.01); *G02B 5/0205* (2013.01); *G02B 5/0268* (2013.01); *C08L 2312/00* (2013.01); *C08L 2312/06* (2013.01)

(58) Field of Classification Search
    CPC .. C08L 33/08; C08L 2312/00; C08L 2312/06; C09J 133/06; C09J 133/08
    USPC ........................................................ 359/599
    See application file for complete search history.

(56) References Cited

U.S. PATENT DOCUMENTS

| | | | | |
|---|---|---|---|---|
| 9,850,405 | B2* | 12/2017 | Edmonds | C09J 7/385 |
| 10,108,040 | B2* | 10/2018 | Lee | G02F 1/133504 |
| 10,113,089 | B2* | 10/2018 | Edmonds | C09J 7/50 |
| 2013/0004728 | A1* | 1/2013 | Boyd | G02B 5/045 |
| | | | | 428/172 |
| 2014/0253845 | A1* | 9/2014 | Shibata | G02B 6/0055 |
| | | | | 349/65 |
| 2016/0230048 | A1* | 8/2016 | Edmonds | C09J 7/385 |
| 2016/0244642 | A1* | 8/2016 | Edmonds | C09J 163/00 |
| 2017/0123262 | A1* | 5/2017 | Lee | G02F 1/133504 |
| 2019/0232583 | A1* | 8/2019 | Hattori | B29D 11/0073 |

* cited by examiner

OPTICAL ASSEMBLY AND THE METHOD TO MAKE THE SAME

CROSS-REFERENCE TO RELATED APPLICATION

This application is a continuation of U.S. patent application Ser. No. 15/803,826 filed on Nov. 5, 2017, which is a continuation of U.S. patent application Ser. No. 15/093,752 filed on Apr. 8, 2016, now U.S. Pat. No. 9,841,542, which claims priority of U.S. provisional application Ser. No. 62/301,640 filed on Mar. 1, 2016. All of these applications are incorporated by reference herein in their entirety.

BACKGROUND OF THE INVENTION

1. Field of the Invention

The present invention relates to an optical assembly, and more particularly to an optical assembly combined by an adhesive.

2. Description of Related Art

FIG. 1 illustrates a schematic cross-sectional view of an adhesive optical assembly 10. The optical assembly 10 includes a bottom light enhancement film 11, a top light enhancement film 12 disposed over the bottom light enhancement film 11 and an adhesive layer 13 between the top light enhancement film 12 and the bottom light enhancement film 11.

There are many potential problems in the adhesive optical assembly 10, including: (a) because the contact area between the adhesive layer 13 and the prisms 14 of the bottom light enhancement film 11 is smaller, there is not enough adhesion force between the adhesive layer 13 and the prisms 14 of the bottom light enhancement film 11; (b) increasing the thickness of the adhesive layer 13 is a way to increase the adhesion force between the adhesive layer 13 and the prisms 14 of the bottom light enhancement film 11, but it usually leads to the reduction of the optical gain (i.e. brightness); (c) "wick phenomenon" (i.e. capillarity phenomenon) 15 resulting from the adhesion between the adhesive layer 13 and the prisms 14 of the bottom light enhancement film 11 also largely reduces the optical gain.

Accordingly, the present invention proposes an optical assembly and its manufacturing method to overcome the above-mentioned disadvantages.

SUMMARY OF THE INVENTION

The present invention uses the hydrophilic/hydrophobic characteristic of the adhesive disposed on the bottom surface of the first optical film and the microstructures of the second optical film to improve the adhesive force between the adhesive and the microstructures of the second optical film and the optical gain of the optical assembly at the same time.

In one embodiment, the present invention discloses an optical assembly comprising: a first optical film comprising a first surface; an adhesive disposed on the first surface of the first optical film; and a second optical film comprising a second surface, wherein the second surface of the second optical film comprises a plurality of microstructures, wherein the plurality of microstructures are bonded to the adhesive; wherein the adhesive is made of a first material and the plurality of microstructures are made of a second material, wherein the hydrophilic/hydrophobic characteristic of the first material is configured with respect to the hydrophilic/hydrophobic characteristic of the second material such that the adhesive force between the adhesive and the plurality of microstructures of the second optical film is greater than 100 g/25 mm and the optical gain of the optical assembly is greater than 1.5.

In one embodiment, the present invention discloses a method of forming an optical assembly comprising: providing a first optical film comprising a first surface; disposing an adhesive on the first surface of the first optical film; and providing a second optical film comprising a second surface, wherein the second surface of the second optical film comprises a plurality of microstructures, wherein the plurality of microstructures are bonded to the adhesive; wherein the adhesive is made of a first material and the plurality of microstructures are made of a second material, wherein the hydrophilic/hydrophobic characteristic of the first material is configured with respect to the hydrophilic/hydrophobic characteristic of the second material such that the adhesive force between the adhesive and the plurality of microstructures of the second optical film is greater than 100 g/25 mm, the optical gain of the optical assembly is greater than 1.5.

In one embodiment, the present invention discloses an optical assembly comprising: a first optical film comprising a first surface; an adhesive disposed on the first surface of the first optical film; and a second optical film comprising a second surface, wherein the second surface of the second optical film comprises a plurality of microstructures, wherein the plurality of microstructures are bonded to the adhesive; wherein the adhesive is made of a first hydrophilic material and a first hydrophobic material, and the plurality of microstructures are made of a second hydrophobic material, wherein the weight ratio of the first hydrophobic material to the first hydrophilic material is 0.25~1.55.

The detailed technology and above preferred embodiments implemented for the present invention are described in the following paragraphs accompanying the appended drawings for people skilled in the art to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as follows. The described preferred embodiments are presented for purposes of illustrations and description and they are not intended to limit the scope of the present invention.

Figure 1:
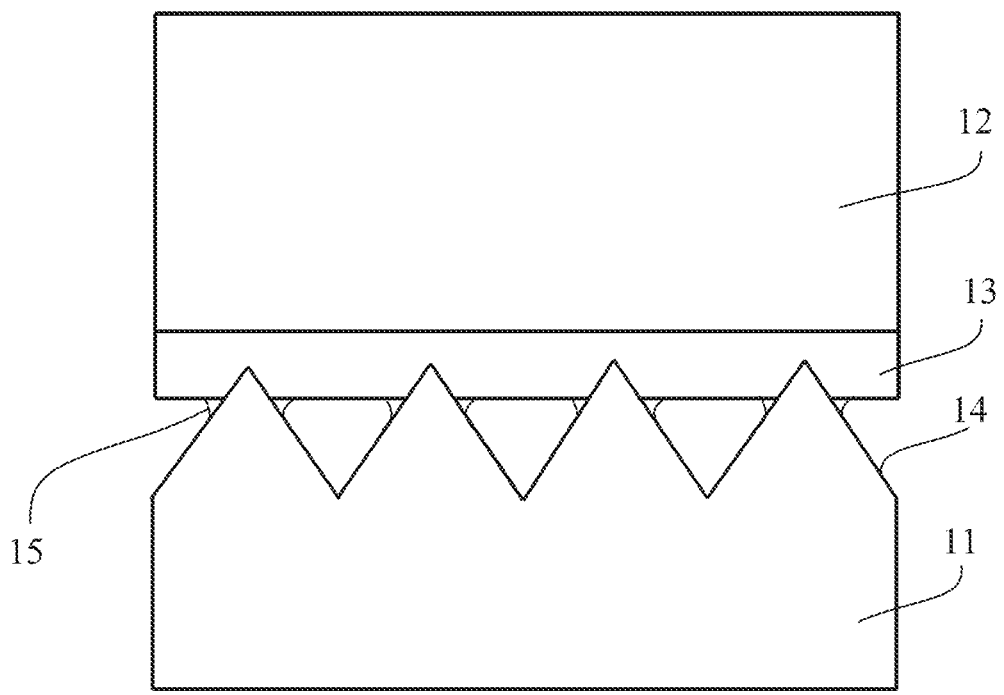
FIG. 1 illustrates a schematic cross-sectional view of an adhesive optical assembly.
Figure 2:
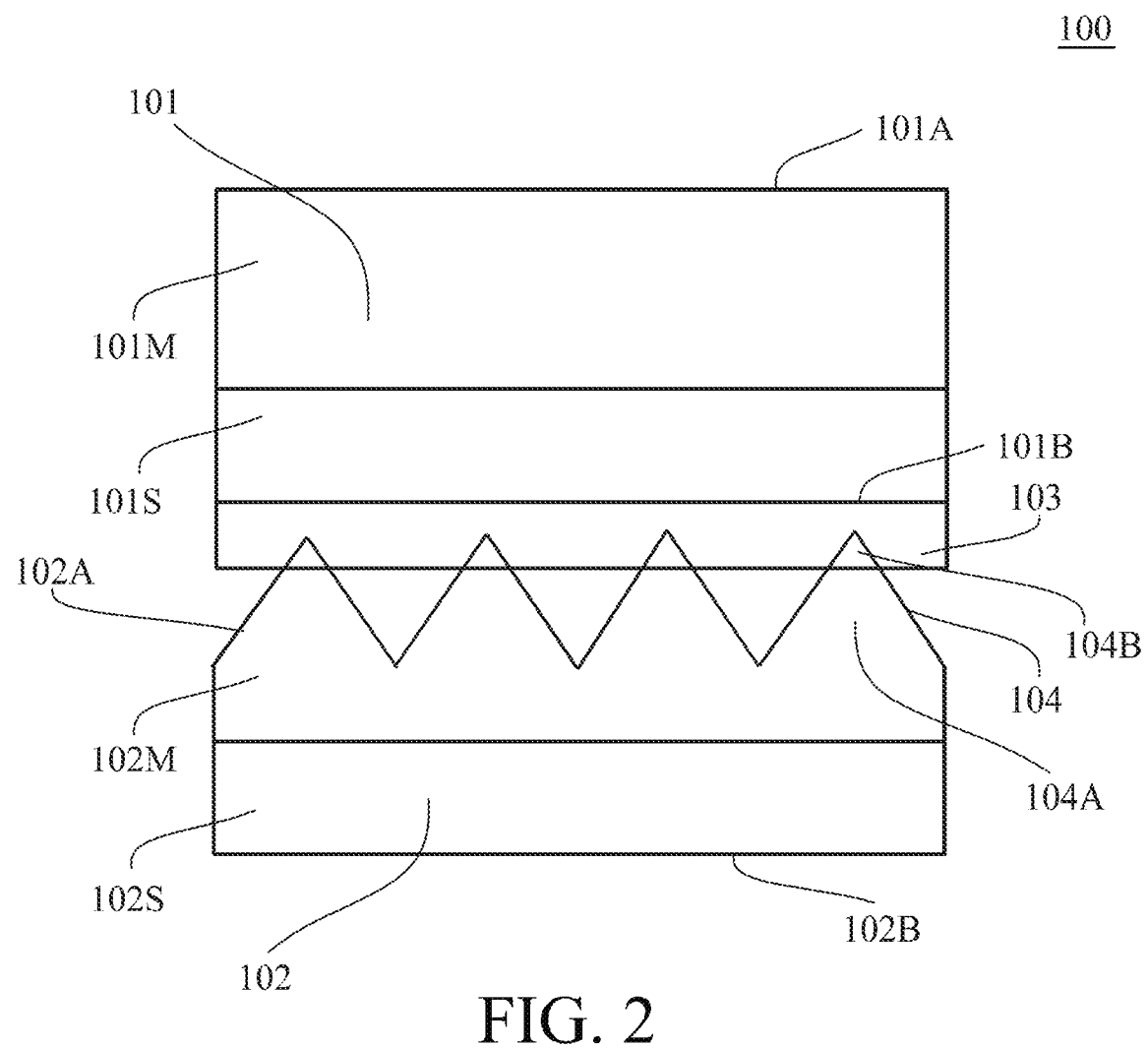
FIG. 2 illustrates a schematic cross-sectional view of an optical assembly in the present invention.

FIG. 2 illustrates a schematic cross-sectional view of an optical assembly 100 in the present invention. The optical assembly 100 comprises a first optical film 101, a second optical film 102 and an adhesive 103 between the first optical film 101 and the second optical film 102. The first optical film 101 has a top surface 101A and a bottom surface 101B. The adhesive 103 is disposed on the bottom surface 101B of the first optical film 101. The second optical film 102 has a top surface 102A and a bottom surface 102B. The top surface 102A of the second optical film 102 comprises a plurality of microstructures 104 (preferably, each microstructure 104 is a prism), and the microstructures 104 are bonded to the adhesive 103. The adhesive 103 is made of a first material and the microstructures 104 are made of a second material.

The hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 100 g/25 mm and the optical gain (i.e. brightness) of the optical assembly 100 is greater than 1.5. The present invention uses the hydrophilic/hydrophobic characteristic of the first material and the second material to improve the adhesive force between the adhesive 103 and the microstructures 104 of the second optical film 102 and the optical gain of the optical assembly 100 at the same time. In other words, the present invention can achieve the goal of providing sufficient adhesive force between the adhesive 103 and the microstructures 104 of the second optical film 102 while maintaining the optical gain of the optical assembly 100 within operating ranges simply by selecting appropriate hydrophilic/hydrophobic characteristic of the first material with respect to the hydrophilic/hydrophobic characteristic of the second material without adding other complex processes, thereby the manufacturing cost can be largely reduced. Preferably, if wick phenomenon (between the adhesive 103 disposed on the bottom surface 101B of the first optical film 101 and the microstructures 104 of the second optical film 102) results from the hydrophilic/hydrophobic consistency of the first material and the second material, increasing the surface area (the area not embedded in the adhesive 103) of the microstructures 104 of the second optical film 102, reducing the thickness of the adhesive 103 or any other suitable method can improve the optical gain of the optical assembly 100.

The hydrophilic/hydrophobic characteristic of the first material and the second material can be further configured to improve the adhesive force between the adhesive 103 and the microstructures 104 of the second optical film 102 and the optical gain of the optical assembly 100 at the same time. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 120 g/25 mm and the optical gain (i.e. brightness) of the optical assembly 100 is greater than 1.52. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 140 g/25 mm and the optical gain (i.e. brightness) of the optical assembly 100 is greater than 1.52. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 150 g/25 mm and the optical gain (i.e. brightness) of the optical assembly 100 is greater than 1.55. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 160 g/25 mm and the optical gain (i.e. brightness) of the optical assembly 100 is greater than 1.57. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 180 g/25 mm and the optical gain (i.e. brightness) of the optical assembly 100 is greater than 1.6. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 200 g/25 mm and the optical gain (i.e. brightness) of the optical assembly 100 is greater than 1.62. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 220 g/25 mm and the optical gain (i.e. brightness) of the optical assembly 100 is greater than 1.65. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 250 g/25 mm and the optical gain (i.e. brightness) of the optical assembly 100 is greater than 1.67. In one embodiment, the hydrophilic/hydrophobic characteristic of the first material is configured with respect to the hydrophilic/hydrophobic characteristic of the second material such that the adhesive force between the adhesive 103 and the microstructures 104 of the second optical film 102 is greater than 250 g/25 mm and the optical gain (i.e. brightness) of the optical assembly 100 is greater than 1.7. In one embodiment, the contact angle of the first material cannot be smaller than the contact angle of the second material to meet the adhesive force and the optical gain which are above-mentioned. In another embodiment, the contact angle of the first material cannot be greater than the contact angle of the second material to meet the adhesive force and the optical gain which are above-mentioned. In other words, the specific hydrophilic/hydrophobic weight ratio of the first material to the second material can meet the adhesive force and the optical gain which are above-mentioned.

The thickness of the adhesive 103 can be 0.5~3 μm. The hydrophilic/hydrophobic characteristic of the first material and the second material and the thickness of the adhesive 103 can be further configured to improve the adhesive force between the adhesive 103 and the microstructures 104 of the second optical film 102 and the optical gain of the optical assembly 100 at the same time. In one embodiment, the thickness of the adhesive 103 can be 0.5~2 μm. In one embodiment, the thickness of the adhesive 103 can be 0.5~1.5 μm (1~1.5 μm or 0.5~1 μm). Although the thickness of the adhesive 103 is smaller (e.g. <1.5 μm), the adhesive force is large enough to avoid the separation of the adhesive 103 and the microstructures 104 of the second optical film 102. Besides, the smaller thickness of the adhesive 103 can improve the optical gain. Preferably, if wick phenomenon results from the hydrophilic/hydrophobic consistency of the first material and the second material, increasing the surface area (the area not embedded in the adhesive 103) of the microstructures 104 of the second optical film 102, reducing the thickness of the adhesive 103 or any other suitable method can improve the optical gain of the optical assembly 100. In one embodiment, the contact angle of the first material can be not smaller than the contact angle of the second material to meet the adhesive force and the optical gain which are above-mentioned. In another embodiment, the contact angle of the first material cannot be greater than the contact angle of the second material to meet the adhesive force and the optical gain which are above-mentioned. In other words, the specific hydrophilic/hydrophobic weight ratio of the first material to the second material can meet the adhesive force and the optical gain which are above-mentioned.

The hydrophilic/hydrophobic characteristic of the first material and the hydrophilic/hydrophobic characteristic of the second material is configured to have the difference of the surface tension between the adhesive 103 and the plurality of microstructures 104 of the second optical film 102 greater than 3 dyne/cm such that the adhesive force between the adhesive 103 and the plurality of microstructures 104 of the second optical film 102 is greater than 100 g/25 mm and the optical gain of the optical assembly is greater than 1.5.

The hydrophilic/hydrophobic characteristic of the first material and the second material and the difference of the surface tension can be further configured to improve the adhesive force between the adhesive 103 and the microstructures 104 of the second optical film 102 and the optical gain of the optical assembly 100 at the same time. In one embodiment, the difference of the surface tension between the adhesive 103 and the plurality of microstructures 104 of the second optical film 102 is greater than 3 dyne/cm. In one embodiment, the difference of the surface tension between the adhesive 103 and the plurality of microstructures 104 of the second optical film 102 is greater than 4 dyne/cm. In one embodiment, the difference of the surface tension between the adhesive 103 and the plurality of microstructures 104 of the second optical film 102 is greater than 5 dyne/cm. In one embodiment, the difference of the surface tension between the adhesive 103 and the plurality of microstructures 104 of the second optical film 102 is greater than 7 dyne/cm. In one embodiment, the difference of the surface tension between the adhesive 103 and the plurality of microstructures 104 of the second optical film 102 is greater than 9 dyne/cm. Preferably, if wick phenomenon results from the hydrophilic/hydrophobic consistency of the first material and the second material, increasing the surface area (the area not embedded in the adhesive 103) of the microstructures 104 of the second optical film 102, reducing the thickness of the adhesive 103 or any other suitable method can improve the optical gain of the optical assembly 100. In one embodiment, the contact angle of the first material can be not smaller than the contact angle of the second material to meet the adhesive force and the optical gain which are above-mentioned. In another embodiment, the contact angle of the first material can be not greater than the contact angle of the second material to meet the adhesive force and the optical gain which are above-mentioned. In other words, the specific hydrophilic/hydrophobic weight ratio of the first material to the second material can meet the adhesive force and the optical gain which are above-mentioned.

Figure 3A:
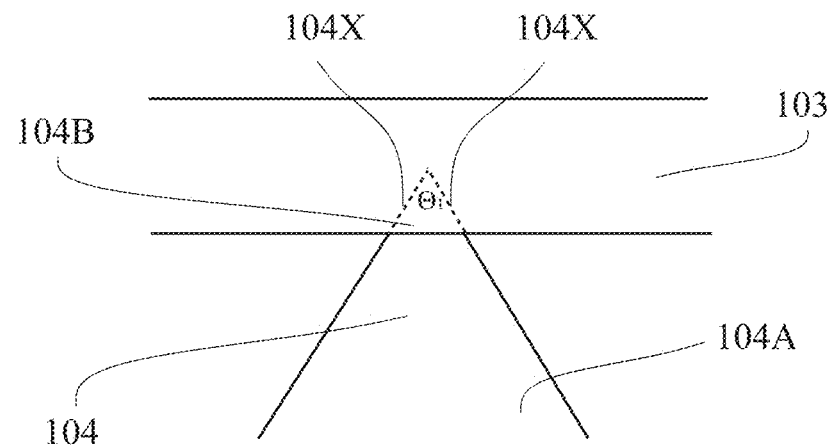
FIG. 3A illustrates a schematic cross-sectional view of a light directing portion of a microstructure.
Figure 3B:
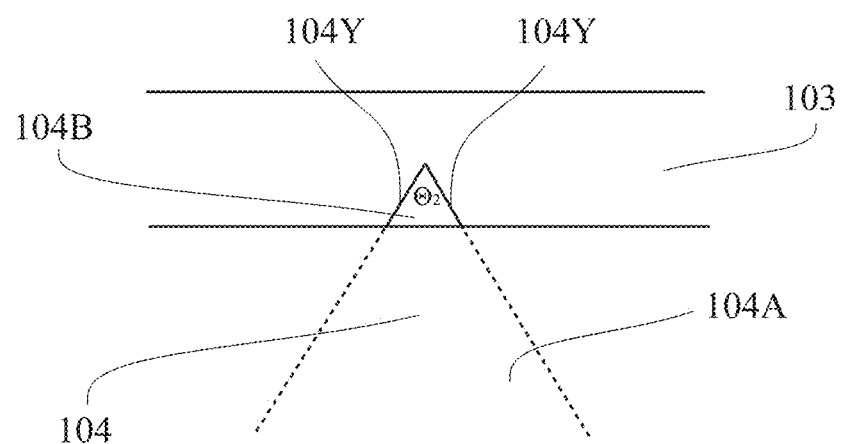
FIG. 3B illustrates a schematic cross-sectional view of a bonding portion of a microstructure.

Each microstructure 104 has a light directing portion 104A and a bonding portion 104B bonded to the adhesive 103. FIG. 3A illustrates a schematic cross-sectional view of a light directing portion 104A of a microstructure 104. FIG. 3B illustrates a schematic cross-sectional view of a bonding portion 104B of a microstructure 104. The light directing portion 104A has two intersecting extending-facets (e.g., extending-planes) 104X defining a first dihedral angle $\Theta_1$ and the bonding portion 104B has two intersecting facets (e.g., planes) 104Y defining a second dihedral angle $\Theta_2$, wherein the first dihedral angle this substantially equal to the second dihedral angle $\Theta_2$ (in fact, the two intersecting extending-facets 104X of the light directing portion 104A is consistent with the two intersecting facets 104Y of the bonding portion 104B). Preferably, the first dihedral angle $\Theta_1$ (or the second dihedral angle $\Theta_2$) is 90 degrees; however, the present invention is not limited to this case. The microstructure 104 can extend along a first direction; in one embodiment, the microstructure 104 can be a regular microstructure having a cross-sectional shape of the same size along in a first direction (e.g., regular prism or regular lens). The microstructure 104 can be a bulk microstructure (e.g., microlens). Specifically, the present invention adopts regular microstructures 104 (regular triangular prism preferably) to be boned to the adhesive 103; the microstructure 104 does not need to have a special shape to increase the area contacting the adhesive 103 to increase adhesive force, so it can reduce the process complexity. Moreover, the smaller thickness of the adhesive 103 is (e.g. <1.5 μm) and regular microstructures can also reduce the total thickness of the optical assembly 100.

Figure 4:
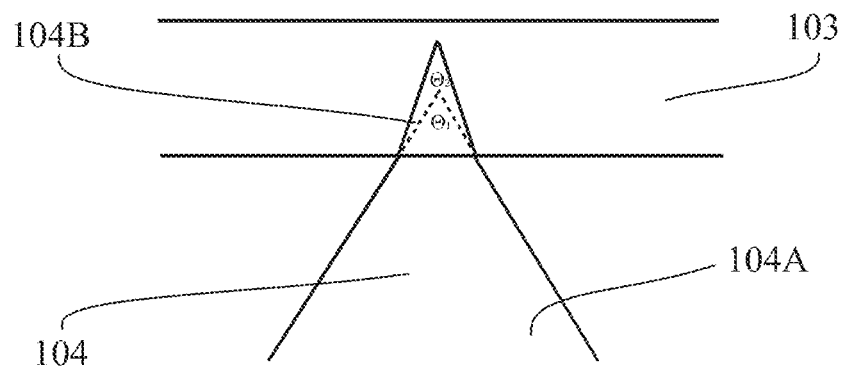
FIG. 4 illustrates a schematic cross-sectional view of a light directing portion and a bonding portion of a microstructure in another embodiment.
Figure 5:
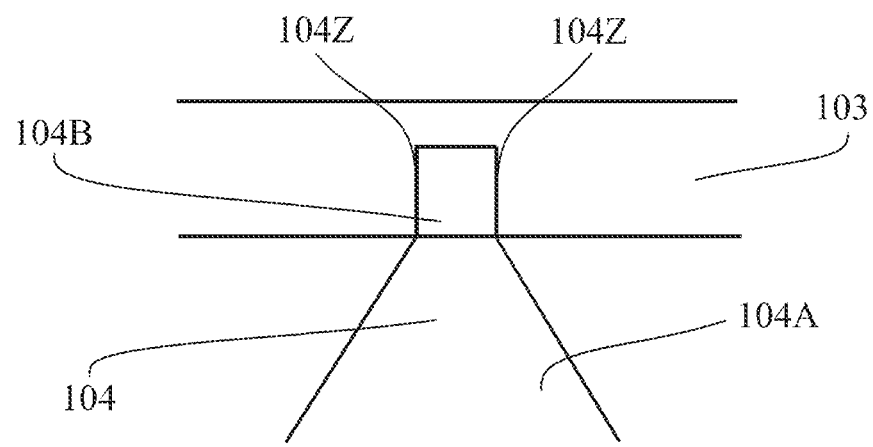
FIG. 5 illustrates a schematic cross-sectional view of a light directing portion and a bonding portion of a microstructure in another embodiment.
Figure 6A:
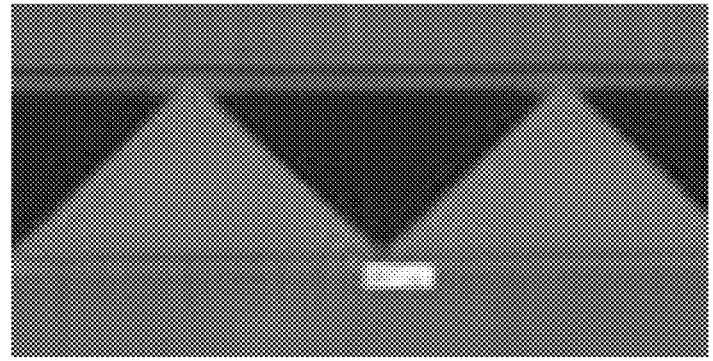
FIG. 6A to FIG. 6E illustrate actual cross-sectional views of wick phenomenon in Example 1, Example 2, Example 3, Comparative Example 1 and Comparative Example 2.
Figure 6B:
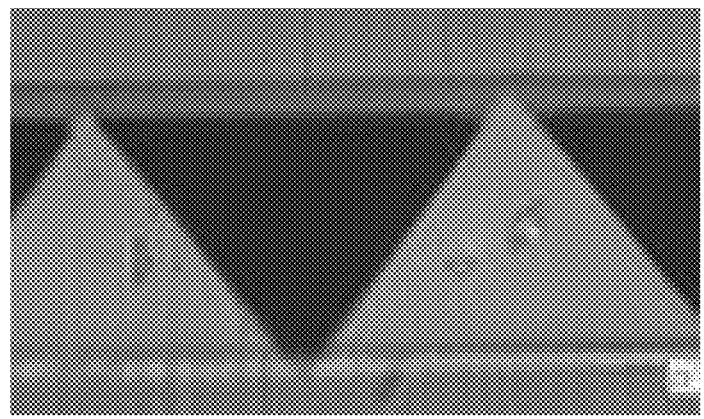
Figure 6C:
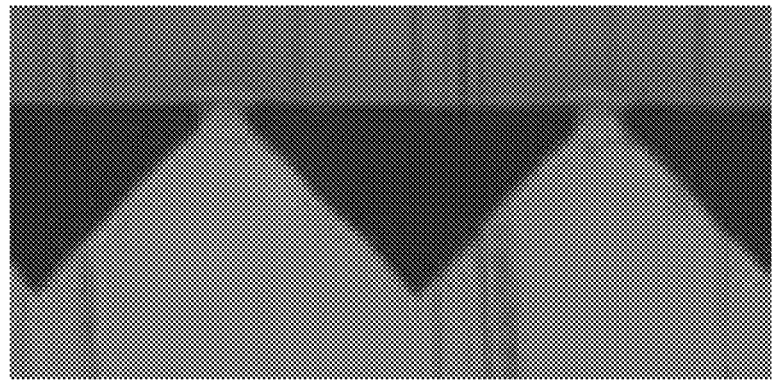
Figure 6D:
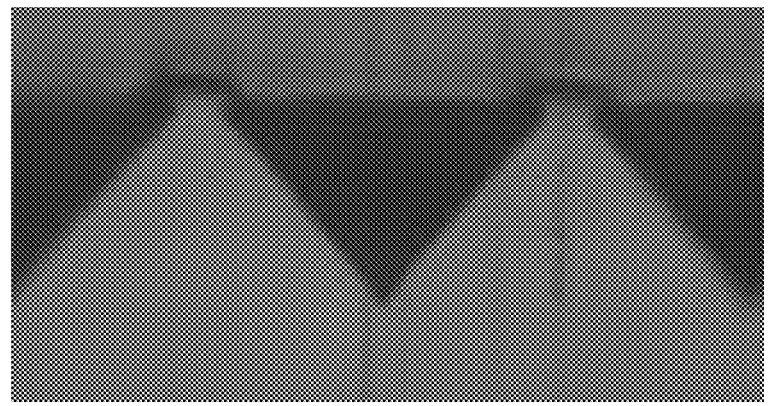
Figure 6E:
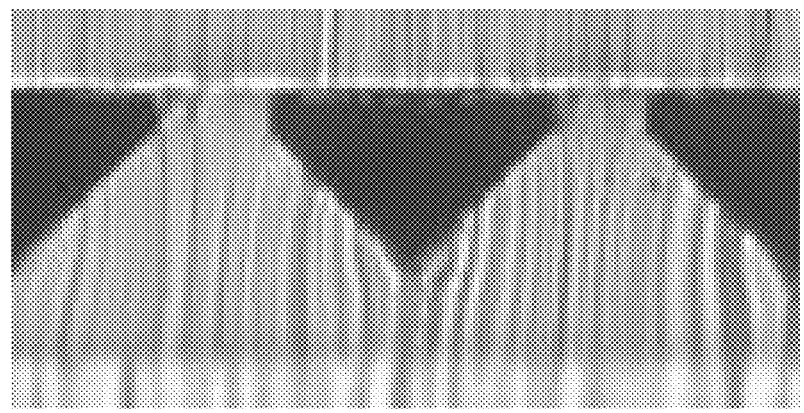

FIG. 4A illustrates a schematic cross-sectional view of a light directing portion 104A and a bonding portion 104B of a microstructure 104 in another embodiment. The second dihedral angle $\Theta_2$ can be smaller than the first dihedral angle $\Theta_1$ so that the bonding portion 104B has more area contacting the adhesive 103 to improve the adhesive force. Moreover, the bonding portion 104B can have two parallel facets (e.g., planes) 104Z so that the bonding portion 104B has more area contacting the adhesive 103 to improve the adhesive force (see FIG. 5).

The first optical film 101 can be any suitable optical film, such as light enhancement film, diffusing sheet, DBEF and so on. The second optical film 102 can be also any suitable optical film, such as light enhancement film, diffusing sheet, DBEF and soon. The first optical film 101 may comprise a substrate 101S (e.g., PET substrate) and the microstructure layer 101M disposed on the substrate 101S. The second optical film 102 may have a substrate 102S (e.g., PET substrate) and the microstructure layer 102M disposed on the substrate 102S.

The adhesive 103 are made of a first hydrophilic material and a first hydrophobic material, and the microstructures 104 are made of a second hydrophilic material, wherein the weight ratio of the first hydrophilic material to the first hydrophobic material is 0.25~1.55. Because the microstructures 104 are made of a hydrophilic material, decrease the weight ratio of the first hydrophilic material to the first hydrophobic material of the adhesive 103 so that the adhesive 103 is inclined to be a hydrophobic material; accordingly, wick phenomenon is improved due to hydrophilic/hydrophobic repulsion.

The smaller weight ratio of the first hydrophilic material to the first hydrophobic material of the adhesive 103 can contribute to the improvement of wick phenomenon, but the adhesive force between the adhesive 103 and the microstructures 104 is so weak due to hydrophilic/hydrophobic repulsion that it is possible that the separation of the adhesive 103 and the microstructures 104 often happens in the subsequent process; the greater weight ratio of the first hydrophilic material to the first hydrophobic material of the adhesive 103 can worsen wick phenomenon and the optical gain of the optical assembly 100 is largely reduced. Therefore, the optimal weight ratio of the first hydrophilic material to the first hydrophobic material of the adhesive 103 can improve wick phenomenon and the adhesive force at the same time.

The weight ratio of the first hydrophilic material to the first hydrophobic material can be further configured to improve the adhesive force between the adhesive 103 and the microstructures 104 of the second optical film 102 and the optical gain of the optical assembly 100 at the same time. In one embodiment, the weight ratio of the first hydrophilic material to the first hydrophobic material is 0.3~1.5. In one embodiment, the weight ratio of the first hydrophilic material to the first hydrophobic material is 0.4~1.2. In one embodiment, the weight ratio of the first hydrophilic material to the first hydrophobic material is 0.45~1.1. In one embodiment, the weight ratio of the first hydrophilic material to the first hydrophobic material is 0.45~1.0. Preferably, if wick phenomenon results from the hydrophilic/hydrophobic consistency of the first material and the second material, increasing the surface area (the area not embedded in the adhesive 103) of the microstructures 104 of the second optical film 102, reducing the thickness of the adhesive 103 or any other suitable method can improve the optical gain of the optical assembly 100. In one embodiment, the contact angle of the material of the adhesive 103 cannot be smaller than the contact angle of the material of the microstructures 104 of the second optical film 102 to meet the adhesive force and the optical gain which are above-mentioned. In another embodiment, the contact angle of the material of the adhesive 103 cannot be greater than the contact angle of the material of the microstructures 104 of the second optical film 102 to meet the adhesive force and the optical gain which are above-mentioned. In other words, the specific hydrophilic/hydrophobic weight ratio of the material of the adhesive 103 is chosen for the hydrophilic material of the microstructures 104 of the second optical film 102 can meet the adhesive force and the optical gain which are above-mentioned.

The weight ratio of the first hydrophilic material to the first hydrophobic material is 0.25~1.55 such that the adhesive force between the adhesive 103 and the microstructures 104 of the second optical film 102 is greater than 100 g/25 mm and the optical gain of the optical assembly is greater than 1.5. The present invention uses the weight ratio of the first hydrophilic material to the first hydrophobic material and the second hydrophilic material to improve the adhesive force between the adhesive 103 and the microstructures 104 of the second optical film 102 and the optical gain of the optical assembly 100 at the same time. Preferably, if wick phenomenon results from the hydrophilic/hydrophobic consistency of the material of the adhesive 103 and the microstructures 104 of the second optical film 102, increasing the surface area (the area not embedded in the adhesive 103) of the microstructures 104 of the second optical film 102, reducing the thickness of the adhesive 103 or any other suitable method can improve the optical gain of the optical assembly 100.

The weight ratio of the first hydrophilic material to the first hydrophobic material and the second hydrophilic material can be further configured to improve the adhesive force between the adhesive 103 and the microstructures 104 of the second optical film 102 and the optical gain of the optical assembly 100 at the same time. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 120 g/25 mm and the optical gain (i.e. brightness) of the optical assembly 100 is greater than 1.52. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 140 g/25 mm and the optical gain (i.e. brightness) of the optical assembly 100 is than 1.52. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 150 g/25 mm and the optical gain (i.e. brightness) of the optical assembly 100 is greater than 1.55. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 160 g/25 mm and the optical gain (i.e. brightness) of the optical assembly 100 is greater than 1.57. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 180 g/25 mm and the optical gain (i.e. brightness) of the optical assembly 100 is greater than 1.6. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 200 g/25 mm and the optical gain (i.e. brightness) of the optical assembly 100 is greater than 1.62. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 220 g/25 mm and the optical gain (i.e. brightness) of the optical assembly 100 is greater than 1.65. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 250 g/25 mm and the optical gain (i.e. brightness) of the optical assembly 100 is greater than 1.67. In one embodiment, the weight ratio of the first hydrophilic material to the first hydrophobic material is configured with respect to the second hydrophilic material such that the adhesive force between the adhesive 103 and the microstructures 104 of the second optical film 102 is greater than 250 g/25 mm and the optical gain (i.e. brightness) of the optical assembly 100 is greater than 1.7. In one embodiment, the contact angle of the material of the adhesive 103 cannot be smaller than the contact angle of the material of the microstructures 104 of the second optical film 102 to meet the adhesive force and the optical gain which are above-mentioned. In another embodiment, the contact angle of the material of the adhesive 103 cannot be greater than the contact angle of the material of the microstructures 104 of the second optical film 102 to meet the adhesive force and the optical gain which are above-mentioned. In other words, the specific hydrophilic/hydrophobic weight ratio of the material of the adhesive 103 is chosen for the hydrophilic material of the microstructures 104 of the second optical film 102 can meet the adhesive force and the optical gain which are above-mentioned.

The thickness of the adhesive is 0.5~3 μm. The weight ratio of the first hydrophilic material to the first hydrophobic material and the thickness of the adhesive can be further configured to improve the adhesive force between the adhesive 103 and the microstructures 104 of the second optical film 102 and the optical gain of the optical assembly 100 at the same time. In one embodiment, the thickness of the adhesive can be 0.5~2 μm. In one embodiment, the thickness of the adhesive can 0.5~1.5 μm (1~1.5 μm or 0.5~1 μm). Although the thickness of the adhesive 103 is smaller (e.g. <1.5 μm), the adhesive force is large enough to avoid the separation of the adhesive 103 and the microstructures 104. Besides, the smaller thickness of the adhesive 103 can improve the optical gain. Preferably, if wick phenomenon results from the hydrophilic/hydrophobic consistency of the material of the adhesive 103 and the microstructures 104 of the second optical film 102, increasing the surface area (the area not embedded in the adhesive 103) of the microstructures 104 of the second optical film 102, reducing the thickness of the adhesive 103 or any other suitable method can improve the optical gain of the optical assembly 100. In one embodiment, the contact angle of the material of the adhesive 103 cannot be smaller than the contact angle of the material of the microstructures 104 of the second optical film 102 to meet the adhesive force and the optical gain which are above-mentioned. In another embodiment, the contact angle of the material of the adhesive 103 cannot be greater than the contact angle of the material of the microstructures 104 of the second optical film 102 to meet the adhesive force and the optical gain which are above-mentioned. In other words, the specific hydrophilic/hydrophobic weight ratio of the material of the adhesive 103 is chosen for the hydrophilic material of the microstructures 104 of the second optical film 102 can meet the adhesive force and the optical gain which are above-mentioned.

The weight ratio of the first hydrophilic material to the first hydrophobic material is 0.25~1.55 to have the difference of the surface tension between the adhesive 103 and the microstructures 104 of the second optical film 102 greater than 3 dyne/cm such that the adhesive force between the adhesive 103 and the plurality of microstructures 104 of the second optical film 102 are greater than 100 g/25 mm, the optical gain of the optical assembly is greater than 1.5.

The weight ratio of the first hydrophilic material to the first hydrophobic material and the difference of the surface tension can be further configured to improve the adhesive force between the adhesive 103 and the microstructures 104 of the second optical film 102 and the optical gain of the optical assembly 100 at the same time. In one embodiment, the difference of the surface tension between the adhesive 103 and the microstructures 104 of the second optical film 102 is greater than 3 dyne/cm. In one embodiment, the difference of the surface tension between the adhesive 103 and the microstructures 104 of the second optical film 102 is greater than 4 dyne/cm. In one embodiment, the difference of the surface tension between the adhesive 103 and the microstructures 104 of the second optical film 102 is greater than 5 dyne/cm. In one embodiment, the difference of the surface tension between the adhesive 103 and the microstructures 104 of the second optical film 102 is greater than 7 dyne/cm. In one embodiment, the difference of the surface tension between the adhesive 103 and the microstructures 104 of the second optical film 102 is greater than 9 dyne/cm. Preferably, if wick phenomenon results from the hydrophilic/hydrophobic consistency of the material of the adhesive 103 and the microstructures 104 of the second optical film 102, reducing the thickness of the adhesive 103 or any other suitable method can improve the optical gain of the optical assembly 100. In one embodiment, the contact angle of the material of the adhesive 103 can be not smaller than the contact angle of the material of the microstructures 104 of the second optical film 102 to meet the adhesive force and the optical gain which are above-mentioned. In another embodiment, the contact angle of the material of the adhesive 103 cannot be greater than the contact angle of the material of the microstructures 104 of the second optical film 102 to meet the adhesive force and the optical gain which are above-mentioned. In other words, the specific hydrophilic/hydrophobic weight ratio of the material of the adhesive 103 is chosen for the hydrophilic material of the microstructures 104 of the second optical film 102 can meet the adhesive force and the optical gain which are above-mentioned.

EXPERIMENTS

The following examples take a test of "the ratio the hydrophilic material to the hydrophobic material of the adhesive 103" vs "the hydrophilic material of the prisms 104 of the second optical film 102". However, the present invention is not limited to these examples. In these examples, the hydrophilic materials of the prisms 104 of the second optical film 102 are the same (the surface tension is about 38 dyne/cm), the hydrophilic material of the adhesive 103 includes a combination of Dipentaerythritol Hexaacrylate (DPHA CNS, manufactured by Sartomer Company) and Bisphenol A (EO)$_{30}$ Dimethacrylate (M2301, manufactured by Miwon Company), and the hydrophobic material of the adhesive 103 is Isodecyl Acrylate (M130, manufactured by Miwon). Moreover, photoinitiator 184 is added in each example. After four hours of stirring at normal temperature, proceed to coating, preparing and manufacturing of sample and physical measurement. The measurement result is list in Table 1 and FIG. 6A to FIG. 6E illustrate actual cross-sectional views of wick phenomenon in Example 1, Example 2, Example 3, Comparative Example 1 and Comparative Example 2.

TABLE 1

|  | Example 1 | Example 2 | Example 3 | Comparative Example 1 | Comparative Example 2 |
| --- | --- | --- | --- | --- | --- |
| the ratio of the hydrophilic material to the hydrophobic material of the adhesive | 0.25 | 0.54 | 1 | 1.86 | 4 |

TABLE 1-continued

|  | Example 1 | Example 2 | Example 3 | Comparative Example 1 | Comparative Example 2 |
|---|---|---|---|---|---|
| the thickness of the adhesive (μm) | 1~1.5 | 1~1.5 | 1~1.5 | 1~1.5 | 1~1.5 |
| surface tension (dyne/cm) | 28.1 | 33.3 | 35.2 | 36.6 | 39.0 |
| optical gain (brightness) | 1.67 | 1.66 | 1.63 | 1.6 | 1.56 |
| adhesive force (g/25 mm) | 83 | 181 | 207 | 211 | 220 |
| wick phenomenon | none | none | slight | worse | the worst |

Example 1

Choose a UV resin having the ratio 0.25 of the hydrophilic material to the hydrophobic material as an adhesive 103. Coat the adhesive 103 on the bottom surface 101B of the first optical film 101, control the thickness of the adhesive 103 to 1~1.5 μm after drying the adhesive 103 and bond the prisms 104 of the second optical film 102 to the adhesive 103 by embossing of the roll such that the adhesive 103 and the prisms 104 of the second optical film 102 are physically bonded and then chemically bonded by UV crosslink-curing reaction. Because the adhesive 103 is made of a more hydrophobic UV resin and the prisms 104 of the second optical film 102 is made of a more hydrophilic UV resin, wick phenomenon resulting from the consistency of the hydrophilic/hydrophobic characteristic can be completely overcome and the optical gain is 1.67. However, polarity difference due to the difference of the hydrophilic/hydrophobic characteristic will reduce the adhesive force to 83 g/25 mm.

Example 2

Choose a UV resin having the ratio 0.54 of the hydrophilic material to the hydrophobic material as an adhesive 103. Coat the adhesive 103 on the bottom surface 101B of the first optical film 101, control the thickness of the adhesive 103 to 1~1.5 μm after drying the adhesive 103 and bond the prisms 104 of the second optical film 102 to the adhesive 103 by embossing of the roll such that the adhesive 103 and the prisms 104 of the second optical film 102 are physically bonded and then chemically bonded by UV crosslink-curing reaction. Because the adhesive 103 is made of a more hydrophobic UV resin and the prisms 104 of the second optical film 102 is made of a more hydrophilic UV resin, wick phenomenon resulting from the consistency of the hydrophilic/hydrophobic characteristic can be completely overcome and the optical gain is 1.66. Although the adhesive 103 is still made of a hydrophobic UV resin, the adhesive force is largely increased to 181 g/25 mm since the ratio of the hydrophilic material to the hydrophobic material of the adhesive 103 increases from 0.25 to 0.54.

Example 3

Choose a UV resin having the ratio 1 of the hydrophilic material to the hydrophobic material as an adhesive 103. Coat the adhesive 103 on the bottom surface 101B of the first optical film 101, control the thickness of the adhesive 103 to 1~1.5 μm after drying the adhesive 103 and bond the prisms 104 of the second optical film 102 to the adhesive 103 by embossing of the roll such that the adhesive 103 and the prisms 104 of the second optical film 102 are physically bonded and then chemically bonded by UV crosslink-curing reaction. Because the ratio of the hydrophilic material to the hydrophobic material of the adhesive 103 is increased to 1, wick phenomenon resulting from the consistency of the hydrophilic/hydrophobic characteristic begins to happen and the optical gain also begins to decrease (the optical gain is 1.63). However, the adhesive force 207 g/25 mm in Example 3 is better than the adhesive force 181 g/25 mm in Example 2.

Comparative Example 1

Choose a UV resin having the ratio 1.86 of the hydrophilic material to the hydrophobic material as an adhesive 103. Coat the adhesive 103 on the bottom surface 101B of the first optical film 101, control the thickness of the adhesive 103 to 1~1.5 μm after drying the adhesive 103 and bond the prisms 104 of the second optical film 102 to the adhesive 103 by embossing of the roll such that the adhesive 103 and the prisms 104 of the second optical film 102 are physically bonded and then chemically bonded by UV crosslink-curing reaction. Because the ratio of the hydrophilic material to the hydrophobic material of the adhesive 103 is increased to 1086, wick phenomenon resulting from the consistency of the hydrophilic/hydrophobic characteristic is more obvious and the optical gain largely decreases (the optical gain is 1.6). However, the adhesive force 211 g/25 mm in Comparative Example 1 is better than the adhesive force 207 g/25 mm in Example 3.

Comparative Example 2

Choose a UV resin having the ratio 4 of the hydrophilic material to the hydrophobic material as an adhesive 103. Coat the adhesive 103 on the bottom surface 101B of the first optical film 101, control the thickness of the adhesive 103 to 1~1.5 μm after drying the adhesive 103 and bond the prisms 104 of the second optical film 102 to the adhesive 103 by embossing of the roll such that the adhesive 103 and the prisms 104 of the second optical film 102 are physically bonded and then chemically bonded by UV crosslink-curing reaction. Because the ratio of the hydrophilic material to the hydrophobic material of the adhesive 103 is increased to 4, wick phenomenon resulting from the consistency of the hydrophilic/hydrophobic characteristic is the most obvious and the optical gain is the lowest (the optical gain is 1.56). However, the adhesive force 220 g/25 mm in Comparative Example 2 is better than the adhesive force 211 g/25 mm in Comparative Example 1.

The above conditions can be also applied to the adhesive 103 made of a first hydrophilic material and a first hydrophobic material and the microstructures 104 of the second optical film 102 made of a second hydrophobic material; for example, the adhesive 103 are made of a first hydrophilic material and a first hydrophobic material, and the microstructures 104 of the second optical film 102 are made of a second hydrophobic material, wherein the weight ratio of the first hydrophobic material to the first hydrophilic material is 0.25~1.55. Therefore, it does not be described in detail herein.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method of forming an optical assembly, comprising:
providing a first optical film comprising a first surface;
forming an adhesive layer on the first surface of the first optical film, wherein the adhesive layer is made of a first material, wherein the thickness of the adhesive layer is in a range from 0.5 µm to 3 µm;
providing a second optical film comprising a second surface, wherein the second surface of the second optical film comprises a plurality of prisms, wherein the plurality of prisms are made of a second material; and
bonding the plurality of prisms to the adhesive layer by controlling a difference between the surface tension of the first material and the surface tension of the second material, wherein the difference is greater than 3 dyne/cm such that the adhesive force between the adhesive layer and the plurality of prisms is enough to prevent the adhesive layer and the plurality of prisms from being separated and the optical gain of the optical assembly is greater than 1.5 when the first material and the second material are fully cured.

2. The method according to claim 1, wherein the plurality of prisms penetrate into the adhesive layer.

3. The method according to claim 1, wherein each of the plurality of prisms has a light directing portion and a bonding portion bonded to the adhesive layer, wherein the light directing portion has two intersecting extending-planes defining a first dihedral angle and the bonding portion has two intersecting planes defining a second dihedral angle, wherein the second dihedral angle is substantially equal to the first dihedral angle.

4. The method according to claim 1, wherein the first material is a hydrophilic material and the second material is a hydrophobic material.

5. The method according to claim 1, wherein the first material is a hydrophobic material and the second material is a hydrophilic material.

6. A method of forming an optical assembly, comprising:
providing a first optical film comprising a first surface;
forming an adhesive layer on the first surface of the first optical film, wherein the adhesive layer is made of a first material;
providing a second optical film comprising a second surface, wherein the second surface of the second optical film comprises a plurality of prisms, wherein the plurality of prisms are made of a second material; and
bonding the plurality of prisms to the adhesive layer by controlling a difference between the surface tension of the first material and the surface tension of the second material, wherein the difference is greater than 3 dyne/cm such that the adhesive force between the adhesive layer and the plurality of prisms is enough to prevent the adhesive layer and the plurality of prisms from being separated and the optical gain of the optical assembly is greater than 1.5 when the first material and the second material are fully cured.

7. The method according to claim 6, wherein the plurality of prisms penetrate into the adhesive layer.

8. The method according to claim 6, wherein each of the plurality of prisms has a light directing portion and a bonding portion bonded to the adhesive layer, wherein the light directing portion has two intersecting extending-planes defining a first dihedral angle and the bonding portion has two intersecting planes defining a second dihedral angle, wherein the second dihedral angle is substantially equal to the first dihedral angle.

9. The method according to claim 6, wherein the first material is a hydrophilic material and the second material is a hydrophobic material.

10. The method according to claim 6, wherein the first material is a hydrophobic material and the second material is a hydrophilic material.

11. An optical assembly, comprising:
a first optical film comprising a first surface;
an adhesive layer formed on the first surface of the first optical film; and
a second optical film comprising a second surface, wherein the second surface of the second optical film comprises a plurality of microstructures, wherein the plurality of microstructures are bonded to the adhesive layer;
wherein the adhesive layer is made of a first material and the plurality of microstructures are made of a second material, wherein the surface tension of the first material and the surface tension of the second material have a difference for bonding the plurality of microstructures to the adhesive layer, wherein the difference is greater than 3 dyne/cm such that the adhesive force between the adhesive layer and the plurality of microstructures is enough to prevent the adhesive layer and the plurality of microstructures from being separated and the optical gain of the optical assembly is greater than 1.5 when the first material and the second material are fully cured.

12. The optical assembly according to claim 11, wherein the plurality of microstructures penetrate into the adhesive layer.

13. The optical assembly according to claim 11, wherein each of the plurality of microstructures has a light directing portion and a bonding portion bonded to the adhesive layer, wherein the light directing portion has two intersecting extending-facets defining a first dihedral angle and the bonding portion has two intersecting facets defining a second dihedral angle, wherein the first dihedral angle is substantially equal to the second dihedral angle.

14. The optical assembly according to claim 11, wherein each of the plurality of microstructures has a light directing portion and a bonding portion bonded to the adhesive layer, wherein the light directing portion has two intersecting extending-planes defining a first dihedral angle and the bonding portion has two intersecting planes defining a second dihedral angle, wherein the second dihedral angle is substantially equal to the first dihedral angle.

15. The optical assembly according to claim 11, wherein the first material is a hydrophilic material and the second material is a hydrophobic material.

16. The optical assembly according to claim 11, wherein the first material is a hydrophobic material and the second material is a hydrophilic material.

* * * * *